United States Patent [19]
Kraut

[11] Patent Number: 5,787,632
[45] Date of Patent: Aug. 4, 1998

[54] PORTABLE DECOY BLIND

[76] Inventor: Robert Kraut, 2195 M-76, Sterling, Mich. 48659

[21] Appl. No.: 741,409

[22] Filed: Oct. 29, 1996

[51] Int. Cl.⁶ ............................................. A01M 31/02
[52] U.S. Cl. ........................ 43/1; 43/2; 135/99; 135/901
[58] Field of Search ...................... 43/1, 2, 3; 135/901, 135/98, 99

[56] References Cited

U.S. PATENT DOCUMENTS

| | | | |
|---|---|---|---|
| 555,025 | 2/1896 | Scheer | 135/98 |
| 2,992,503 | 7/1961 | Webb | 43/1 |
| 4,312,371 | 1/1982 | Koon | 135/98 |
| 4,689,913 | 9/1987 | Brice | 43/3 |
| 5,214,872 | 6/1993 | Buyalos, Jr. | 43/1 |
| 5,595,012 | 1/1997 | Coleman | 43/3 |

*Primary Examiner*—Jack W. Lavinder
*Attorney, Agent, or Firm*—Reising, Ethington, Learman & McCulloch PLLC

[57] ABSTRACT

A blind device for use in concealing a user from view during the course of hunting or observing wild geese includes a shell goose decoy mounted on a support structure that supports the shell in an elevated, generally horizontal position above the ground to provide a substantially unobstructed space below the shell to accommodate and conceal at least a portion of the user's body, and enables the user to swing the shell with generally horizontal movement about a generally vertical offset pivot axis of the support between a covering position in which the shell overlies and conceals the user and a revealing position in which the shell is swung out of the way to one side of the user, providing the user with substantially unobstructed overhead viewing and freedom of movement.

21 Claims, 5 Drawing Sheets

PORTABLE DECOY BLIND

This invention relates to portable hunting blinds and particularly those used for hunting or observing wild geese.

BACKGROUND OF THE INVENTION

Skillful hunters, and particularly those who hunt wild geese, know the importance of concealing themselves from view while hunting. Geese are known for their keen sense of vision and, if not thoroughly hidden, a hunter will be unsuccessful in drawing the birds within shooting range despite the use of the best decoys or calling skills available to the hunter.

When hunting geese, a hunter normally conceals himself in or near an open field that offers plenty of landing room and a good source of food for the geese, such as harvested corn, wheat, or bean field. Typically, a flock of geese, once having found such a field, will return to the same field day after day and as a result, come to know the surroundings quite well.

In an effort to make the field appear natural and non-threatening to the geese, it is common practice to arrange a spread of life-like decoys about the field in the vicinity of the hunter so as to encourage the geese to come within shooting range. The proper selection and placement of the decoys is of utmost importance since their presence is for the purpose of giving a flock of approaching geese a sense of comfort and safety which will encourage them to land or at least come within shooting range of the hunter. If the hunter's means of concealment appears to the geese to be unnatural or out of place, it will alarm the geese and they will avoid the area. This is particularly true in regions where geese are heavily hunted, in which many of the traditional blinds have come to be recognized by the geese and often are ineffective for their intended purpose.

One commonly used approach for concealing oneself in highly hunted areas is to lie in a shallow pit dug in the field and cover the pit with a camouflaged door or screen. The door is usually hinged along one edge to allow the user to swing the door open and sit up to shoot when the geese approach shooting range. Although such blinds can be made to blend in quite well with their surroundings and are successful to that degree, the upward swinging of the door as it is hinged open presents an inherently unnatural and threatening movement to the geese and often will cause them to flare out of range before the hunter is able to shoot. Other blind devices that have similar upwardly swinging doors or screens share the same problem.

A blind device constructed according to the present invention overcomes the foregoing objections.

SUMMARY OF THE INVENTION

A blind for use in hunting or observing wildlife and particularly wild geese comprises a decoy shell having an outer shape and appearance resembling that of a goose and support structure for mounting the shell at an elevated, generally horizontal position above the ground or other support surface to provide sufficient space beneath the shell to accommodate and conceal at least a portion of a user's body. The user is able to pivot the shell with generally horizontal motion about a generally vertical pivot axis adjacent the outer perimeter of the shell to swing the shell between a covering position in which the shell overlies and conceals the user, and a revealing position in which the shell is swung out of the way of a user to a position generally beside the user in order to provide the user with generally unobstructed overhead viewing and freedom of movement.

The life-like decoy appearance of the shell is advantageous in that it attracts rather than deters geese from approaching the area where the hunter is. A good decoy is inherently non-threatening to approaching wild geese and when the blind is used in conjunction with a carefully arranged spread of other decoys, the hunter is able to effectively blend in with the naturally appearing decoy spread rather than hiding beneath an unnatural appearing blind or one that is readily identified by wary geese in highly hunted regions.

In addition to the blind being non-threatening in appearance, the support structure it provides for the decoy shell enables the shell to be swung with horizontal rather than vertical movement. In many of the traditional blinds mentioned above, the hunter must swing a door or other covering screen upwardly in order to uncover himself and gain access to the geese. As mentioned, such upward movement is inherently threatening to wild geese and, despite what may be otherwise a natural appearing blind, will nonetheless alarm the geese and cause them to flare instinctively as the door or screen is swung open. To the contrary, horizontal movement does not pose such a threat, since it is natural for geese to walk around in the field and only when one flies up does it signal the others to do likewise. According to the invention, the offset, generally vertical pivot axis allows the hunter to slowly swing the shell out of his way to the side with horizontal, non-alarming motion in order to uncover the hunter and provide him free access to the geese.

Another advantage the present blind construction provides is that it enables the user to hunt and conceal himself in open grain fields with or without employing a pit. In a harvested bean field, for example, there is very little stubble and the blind is most effective when used with a shallow pit. When so used, the lower edge of the shell may be positioned just a few inches off the ground with sufficient clearance to pass across the user and the low stubble as it is moved from the covering to the revealing position. In other fields such as a harvested corn field, the stubble is somewhat higher and could be used without a shallow pit. When used without a pit, the blind enables the user to quickly and conveniently reposition himself as conditions change by simply reorienting his body in the desired position adjacent the pivot access and then swinging the shell to a position overhead to conceal himself.

Another advantage that the horizontal pivotal movement of the shell offers is that the user, in an effort to draw the geese nearer, can pivot the shell somewhat to give the decoy a more natural appearance simulating that of an active goose on the ground. This is particularly effective when used with other moving decoys in the spread, such as T-flags, windsocks, etc. designed to simulate natural movements of the decoys while on the ground.

According the a further particular aspect of the invention, the support structure is in the form of a support frame having longitudinal and lateral bracing members designed to be installed and mounted within a conventional shell decoy and in turn connectable pivotally to a ground engageable base to support the decoy in the elevated, generally horizontal position and allowing the decoy to pivot with the desired horizontal motion about the generally vertical pivot axis offset to one lateral side of the decoy shell.

The use of the installable support frame is particularly advantageous in that it allows the user to utilize conventional shell decoys for the blind which may already be in the hunter's possession or else are easily obtainable. Use of a conventional shell decoy has the further advantage of giving the blind the same shape and uniform appearance as the other decoys in the spread, and thus the blind will not stand out and cause alarm to wild geese. A still further advantage the use of conventional shell decoys has is that they are stackable with one another in nested relation, allowing a large number of the shells to be transported in compact manner. The preferred frame construction of the invention conforms closely to the interior contour of the shell and has a fairly low profile, thus retaining the ability to stack the decoy shell of the blind with other similar shells.

A further significant advantage in the preferred frame design is that no modification or alteration of the existing decoy shell construction is necessary in order to mount it in the manner described to serve as a blind.

According to a further aspect of the invention, mounting pins are provided at the ends of the lateral brace which extend into preformed side openings in the shell. The mounting pins allow the shell to be tilted somewhat fore and aft on the frame by the user to provide the user with a view of distant approaching geese without completely revealing himself. The forward end of the longitudinal brace ratchets across a molded in feather patterns present on the inside surface of the shell to lock the shell releasibly in a selected position of fore and aft adjustment.

According to yet another feature, the pivot connection between the frame and base is in the form of a downwardly opening socket at one end of the lateral brace that receives the upper end of the base to provide both pivotal and cantilevered support to the frame and shell. The base is preferably in the form of a stake that is driven into the ground beside the user and defines the vertical axis about which the shell pivots. The user is able to adjust the elevation of the shell by the amount the stake is driven into the ground, which is both practical and simple.

The blind is very lightweight and portable and able to be stored in a compact configuration. The frame and stake weight only a few pounds, as does the shell, making them easy to carry for considerable distances if necessary. The frame is detachable from the stake by simply lifting it free and, when removed from the shell, the members of the frame are collapsible to a collinear overlapping configuration to reduce the reflective size for ease of storage and transport. No special tools are needed to assemble the blind. The frame can be installed by hand in the shell and the stake can be driven into the ground with a hammer or other heavy object.

The support structure can be used with a variety of different wildlife shell decoys and other canopy structures including, but not limited to, those resembling duck, turkey, deer, elk, bear, and various other wildlife or naturally occurring objects such as rocks, stumps, ground cover, etc.

THE DRAWINGS

These and other advantages and features of the present invention will become more readily appreciated by those skilled in the art when considered in connection with the following detailed description and drawings, wherein.

DETAILED DESCRIPTION

Referring now more particularly to the drawings, FIGS. 1-5 illustrate a first presently preferred embodiment of a blind construction, designated generally 10, for use in concealing a user U from view during the course of hunting or observing wildlife and particularly, in the illustrated embodiment, wild geese. The device 10 includes a canopy or cover in the preferred form of a hollow bodied decoy shell 12 mounted by a support structure 14 at an elevated, generally horizontal position above the ground G or other support surface to provide sufficient unobstructed space beneath the shell 12 to accommodate and conceal at least a portion of the user's body, such as the user's the head and torso while in a prone position.

Figure 1:
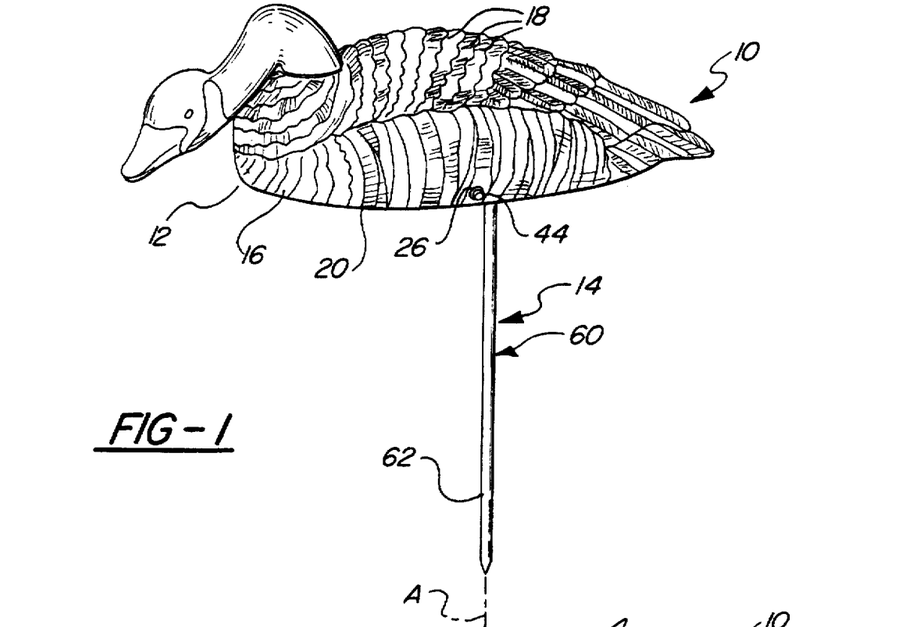
FIG. 1 is a front elevation view of a blind constructed according to a first presently preferred embodiment of the invention.
Figure 2:
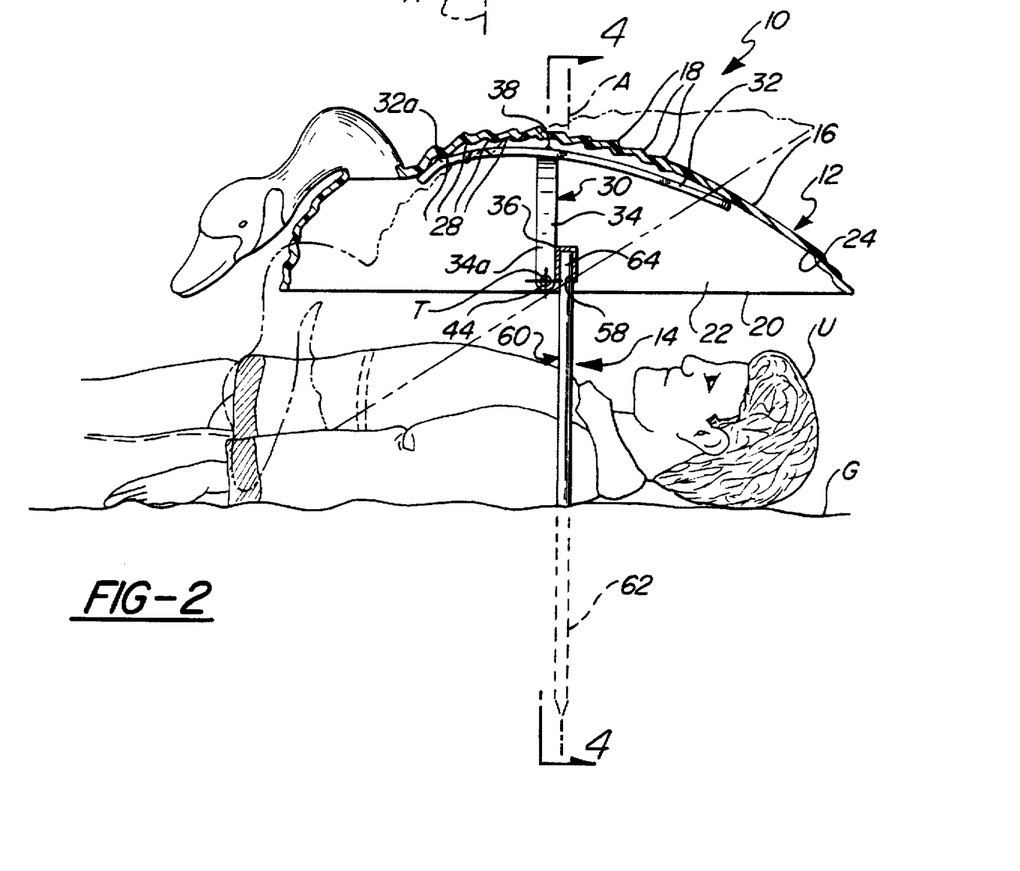
FIG. 2 is a longitudinal, partly sectional view of the blind of FIG. 1.
Figure 3:
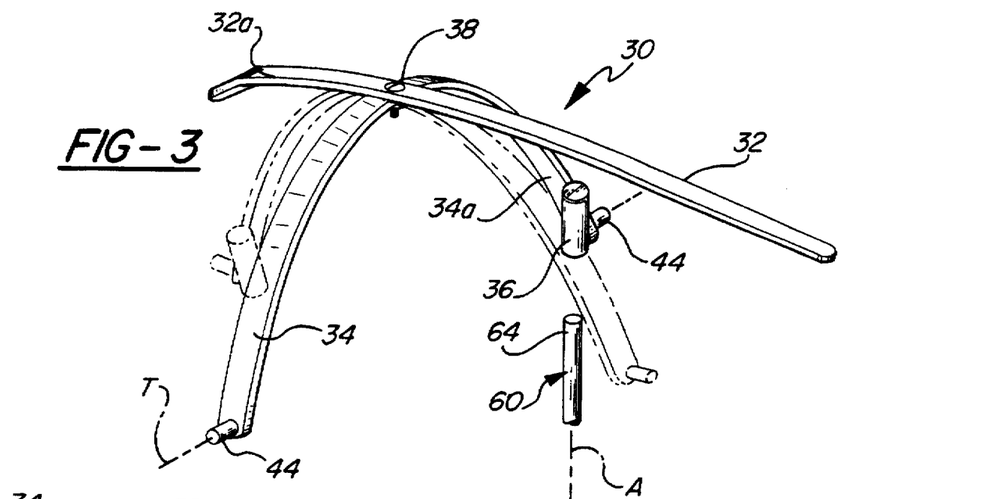
FIG. 3 is a perspective view of the preferred support structure.
Figure 5:
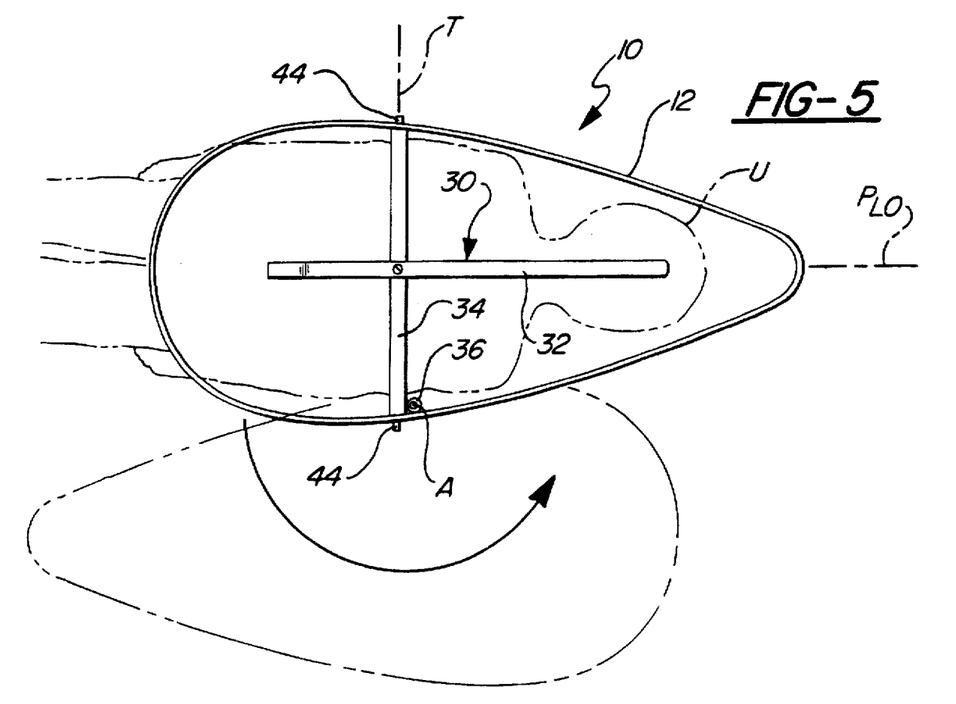
FIG. 5 is a top plan view, shown partly in section, of the preferred decoy device.

According to a broad aspect of the invention, the support structure 14 supports the shell 12 in such manner that the user U is able to pivot the shell 12 about a generally vertical offset pivot axis A with generally horizontal swinging movement of the shell 12 between a covering position, illustrated in FIG. 2 and in solid lines in FIG. 5, in which the shell 12 overlies and conceals the user U within a coverage zone provided beneath the shell 12 and a revealing position, shown by broken chain lines in FIG. 5 in which the shell 12 is swung out of the way of the user U to a position generally beside the user U providing the user U with substantially unobstructed overhead viewing and freedom of movement that would enable the user to sit up and gain access to the wild geese.

In the preferred construction, the decoy shell 12 is a conventional shell decoy of a size known in the industry as a "super magnum" having a typical overall length of about 40–42 inches and a width of about 24 inches. Such shell decoys are available from a number of different manufactures including, by way of example only, Flambeau and G&H Decoys Inc. These decoy shells 12 are constructed of heavy walled, tough, high impact molded plastic material, such as polyethylene having an outer generally convex surface 16 that is molded with anatomical features such as body contours and raised feather portions 18 of such size, shape and coloring as to closely resemble a natural goose. The shell 12 is hollow, providing an interior dome-shaped cavity 22 defined by a generally concave inner surface 24 that opens downwardly to the lower peripheral edge region 20 of the shell 12. The molded plastic construction of the shell is fairly form stable, and rigid yet sufficiently flexible and resilient such that if a force is applied the wall of the shell, particularly near a lower outer peripheral free edge region 20 of the shell, the walls of the shell will flex but will return quickly to shape after the force is removed.

As illustrated in FIG. 5, the shell 12 is generally symmetrical about a central longitudinal vertical plane of symmetry $P_{LO}$. The shell 12 has a pair of side receivers in the preferred form of grommet-reinforced side openings 26 provided on opposite lateral side wall portions 12a, 12b of the shell, and preferably adjacent the lower peripheral edge region 20 in laterally opposed relation to one another so as to define a common tilt axis T transverse and preferably perpendicular to the plane of symmetry $P_{LO}$ extending generally horizontally across the open space of the shell 12 at a location about midway between the opposite longitudinal ends of the shell 12.

As illustrated in FIG. 2, the molded feather pattern 18 of the shell 12 is carried over to the inner surface 24 such that a series of generally laterally extending, longitudinally spaced ribs 28 are provided to the inner surface 24.

The support structure 14 includes a support frame 30 that is designed to be mounted removably within the cavity 22 of the conventional decoy shell 12. As shown best in FIG. 3, the support frame 30 includes a pair of cross brace members 32, 34 that, when installed in the cavity 22 extend in the longitudinal and lateral directions of the shell, respectively, to locate and support a pivot connection portion 36 of the frame 30 adjacent the outer peripheral edge region 20 of the shell, and preferably, but not necessarily, within the coverage zone beneath the shell 12 so as to be concealed from view. Details concerning the pivot connection 36 will be described further below.

The brace members 32, 34 of the preferred embodiment comprise elongate strips of flat, metal bar stock material having a width of about 1 inch and a thickness of about ⅛ of an inch. The braces 32, 34 are formed to be upwardly bowed so as to conform, when installed in the cavity 22, closely to the longitudinal and lateral concave curvature of the inner surface 24. The braces 32, 34 are coupled to one another intermediate their ends by means such as a fastener 38 passing through aligned openings 40, 42 in the braces 32, 34, respectively, allowing the braces to be arranged in a crosswise configuration as illustrated by the solid lines in FIG. 3, for installation within the cavity 22, and a compact folded position, shown by the broken line position in FIG. 3, wherein the lateral brace 32, 34, is folded to extend in the same direction as the longitudinal brace 32, to provide a compact form for storage when not in use.

The support frame 30 includes mounting portions 44 that are engageable with the shell 12 when the frame 30 is installed within the cavity order to secure the shell 12 releasibly to the frame 30. As shown best in FIGS. 3 and 4, the mounting portions 44 in the first embodiment are in the preferred form of mounting pins 44 projecting in generally collinear relation from the opposite ends of the lateral brace member 34. The pins 44 align with and are extendable into the side openings 26 of the shell 12. It is preferred that the size and shape of the frame 30 and the location of the pins 44 be such that it is necessary to flex the shell 12 somewhat in order to pilot the side openings 25 onto the pins 44 to provide a snug fit between the frame 30 and shell 12. As shown in FIG. 2, this closeness of fit urges the forward end 32a of the longitudinal brace member 32 forcibly against the inner surface 24 and the ribs 28. The shell 12 is able to be tilted fore and aft on the frame 30 about the tilt axis T of the aligned mounting pins 44 and openings 26, as shown in FIG. 2, to enable the user to view approaching geese some distance off with minimal exposure of his body. As also shown in FIG. 2, forward end 32a of the ratchets over the ribs 28 as the shell 12 is tilted, to support and lock the shell 12 in any of the selected positions of tilted adjustment without assistance from the user.

Figures 8, 9:
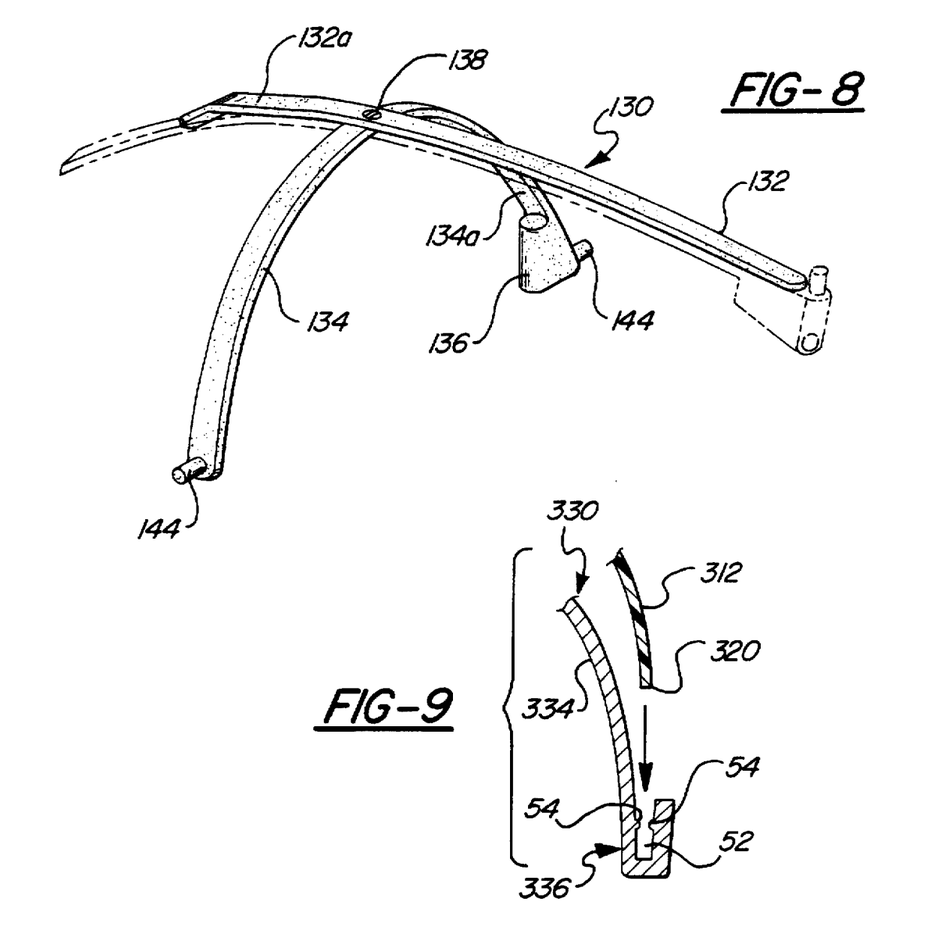
FIG. 8 is a perspective view of an alternative flexible frame construction.
FIG. 9 is an alternative mounting system for securing the shell on the frame.

FIG. 8 illustrates an alternative, flexible support frame 130 that can be used with the same shell 12, wherein like numerals are used to represent corresponding features but are offset by 100. The frame 130 is of the same general construction as that of frame 30 except that the brace members 132, 124 are made of a strong, resiliently flexible material, such as structural plastics. The brace members 132, 134, in their relaxed, unstressed state extend generally linearly between their ends allowing them to be folded to a compact, overlapping, collinear position when not in use for compact storage and transportation of the brace members. However, the braces, 132, 134 are able to be flexed to an upwardly curving, dome-shaped configuration, like that of frame 30 and shown in solid lines in FIG. 8, upon installing the frame 130 within the shell 12 and retain such shape when the mounting pins 144 are received within the side openings 26 of the shell 12.

Figure 7:
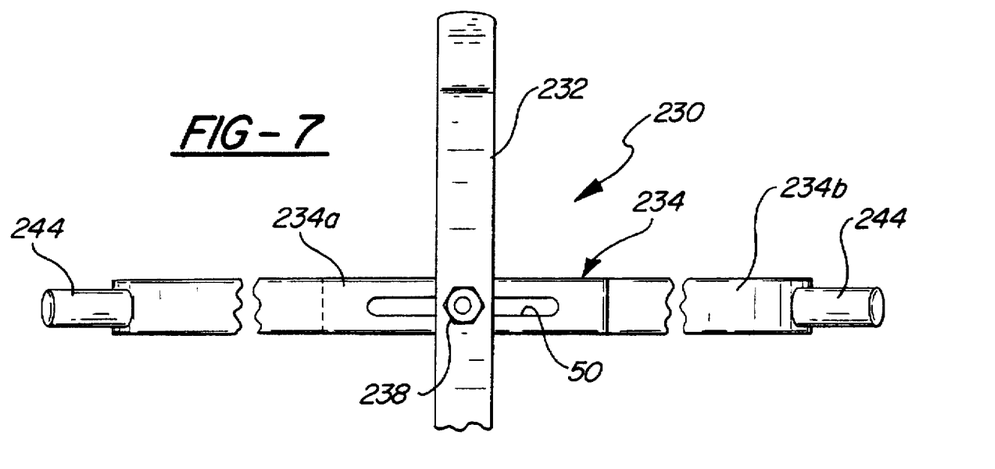
FIG. 7 is a alternative adjustable width frame construction of the support structure.

FIG. 7 illustrates another alternative support frame construction 230 of either of the two general types described above, but wherein the lateral brace member 234 is adjustable in its effective length in order to adjust the location of the mounting pins in relation to the shell 12, so as to locate them in position to be received in the side openings 26. Like numerals are used to reference corresponding features, but are offset by 200. The adjustment feature would be advantageous in the event that there is variation in the size of the shells available for use, or where the location of the side openings differ among shells of the same of different manufacture. The brace 234 has two sections 234a, 234b which overlap one another preferably across the longitudinal brace 232, and wherein at least one of the sections 234a has an elongate adjustment slot 50 that receives the fastener 238 and enables at least that section 234a to slide to the desired position of adjustment and be secured in such position by tightening the fastener 238.

FIG. 9 illustrates an alternative frame construction 330 in which the mounting portions 344 are in the form of U-shaped members at the ends of the lateral brace 334 presenting upwardly opening channels 52 and in which like numerals are used to reference corresponding features but are offset by 300. This frame 330 is useful for mounting shell decoys that lack the side openings 26. The channels 52 are dimensioned and positioned to receive the lower laterally free edge portions 320 of a shell 312 therein in order to mount such shell 312 releasably on the frame. Preferably, one or both walls of the channel 52 are provided with retaining projections 54 which engage the shell 312 as it is extended into the channel 52 and provide a predetermined amount of resistance to the subsequent removal of the shell 312 in order to support the shell 312 securely but releasibly in the channels 52.

Turning now in more detail to the pivot connector 36, which is provided on each of the frame embodiments described above, but which will be described with respect to the first embodiment of the frame 30, the preferred construction is illustrated best in FIGS. 2–5 and comprises a generally cylindrical sleeve member 36 welded or otherwise secured to the lateral brace member 34 adjacent one of its ends 34a in a position to present, when the frame 30 is mounted within the shell 12, a generally vertically downwardly opening socket 58 lying along the pivot axis A. In this way, the pivot axis A is offset on the frame 30 so as to position the axis A adjacent the peripheral edge 20 of the shell 12. As shown best in FIGS. 3 and 5, when so positioned, the axis A is spaced from the longitudinal plane of symmetry $P_{LO}$ of the shell 12 and as such is spaced also from the center of gravity of the shell which lies along the longitudinal plane $P_{LO}$ between the longitudinal ends of the shell 12. This offset location of the pivot axis A on the shell 12 is what enables the shell 12 to be swung from the covering position overlying the user, as illustrated in solid lines in FIG. 5, to the revealing position generally beside the user, illustrated by the broken chain line position of FIG. 5.

The support structure 14 includes, in addition to the frame 30, a support base 60 whose lower end 62 is engageable with the ground G or other support surface and whose upper end 64 is joinable with the pivot connector 36 in order to support the shell 12 and frame 30 in the elevated, generally horizontal position above the ground G while enabling it to pivot about the generally vertical pivot axis A between the covering and revealing positions.

According to one embodiment, the support base 60 is in the form of an elongate, rigid cylindrical stake or rod whose upper end 64 fits into the socket 58 of the pivot connector 36 and whose lower end 62 is drivable into the ground G to orient the stake or rod 60 and hence the pivot axis A generally vertically and locate the shell 12 at the desired elevation above the ground structure G. It will be appreciated that the elevation of the shell 12 can be adjusted by the amount by which the stake 60 is driven into the ground G.

Figures 4, 4A:
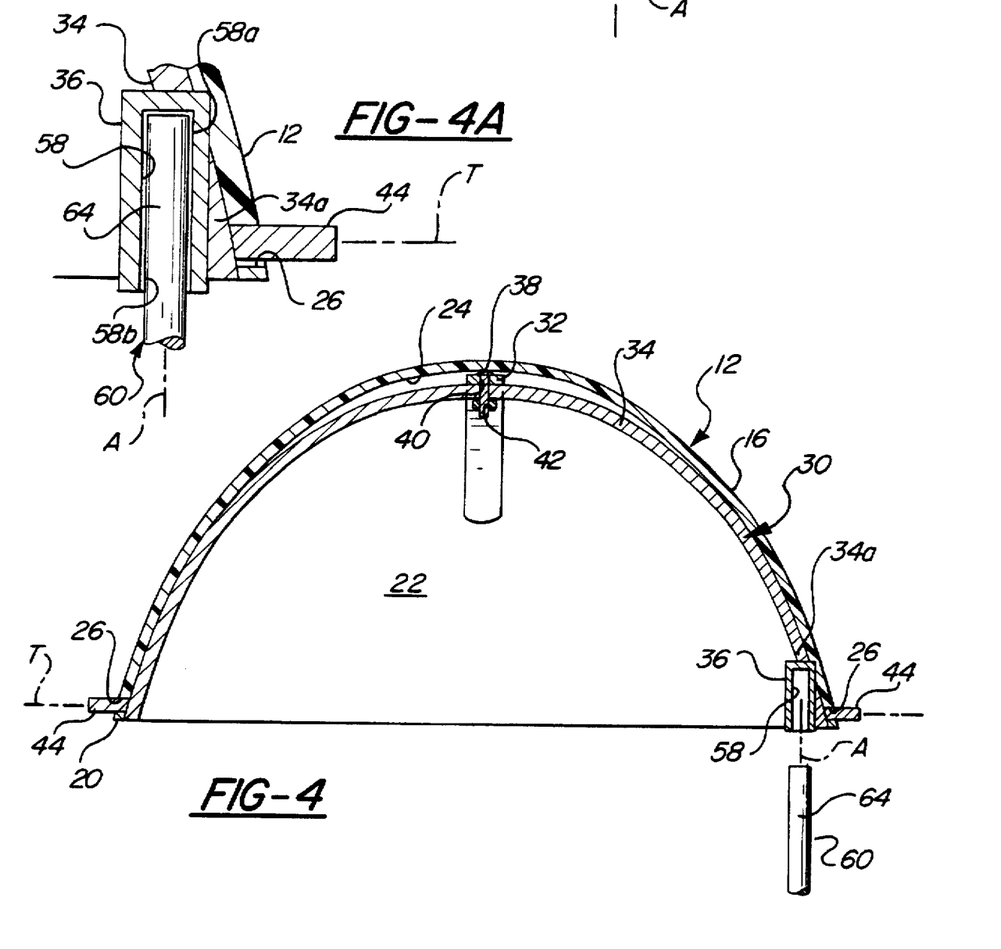
FIG. 4 is a transverse sectional view taken generally along line 4—4 of FIG. 2.
FIG. 4a is an enlarged fragmentary sectional view of the pivot connection region of FIG. 4.

It is preferred that the diameter of the upper end 64 of the stake 60 be dimensioned somewhat smaller than the diameter of the socket 58 to provide 360° rotation of the frame 30 about the stake 60, but sufficiently large to cause the wall of the socket 58 to confront the stake 60 at opposite vertically spaced contact points 58a, 58b of the socket, as illustrated in FIG. 4a. This provides cantilevered support to the frame 30 and shell 12 off the stake 60, such that the shell 12 and frame 30 project to one side of the stake 60 and yet are supported in the generally horizontal elevated position above the ground G. In the preferred construction, the stake 60 is of generally uniform diameter along its entire length except for the extreme lower end 62 which may be pointed to assist in driving the stake into the ground G.

It is to be observed in FIG. 5 that the offset nature of the pivot connector 36 on the frame 30 enables the stake 60 to project vertically downwardly from the shell 12 and frame 30 adjacent the peripheral edge 20 of the shell 12 so as to leave the area or coverage zone beneath the shell 21 substantially unobstructed for the accommodation of the user U.

Figure 6:
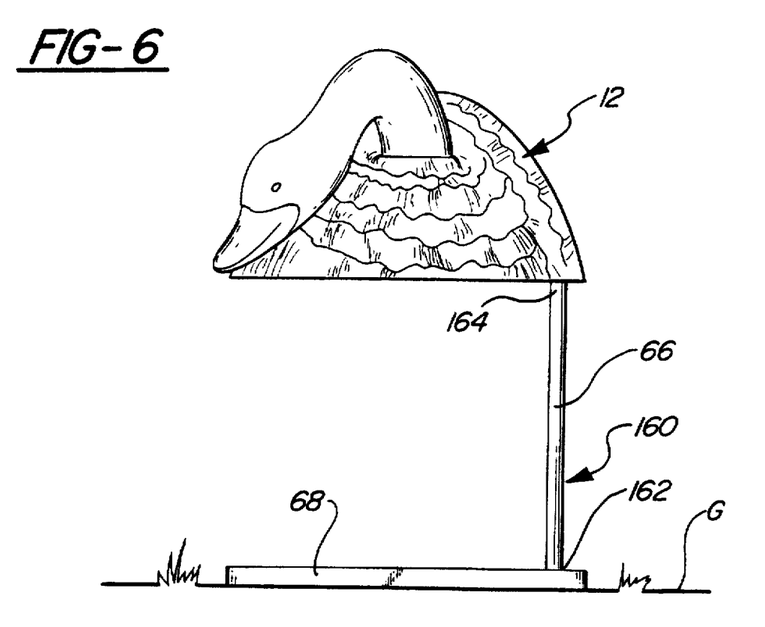
FIG. 6 is an alternative base of the support structure.

FIG. 6 illustrates an alternative support base 160 for the frame 30. In this embodiment, a similar rod 66 is provided having an identical upper end 164 like that of the upper end 64 of the first embodiment, and a lower end 162 in the form of a transverse support leg or base 68 that may be placed on the ground G to orient the stake 66 generally vertically. The base 68 may be positioned beneath the user U or to the side of the user and in the latter case, the base 68 is sufficiently weighted to support the cantilevered frame 30 and shell 12 without tipping over.

THE OPERATION

Figure 10:
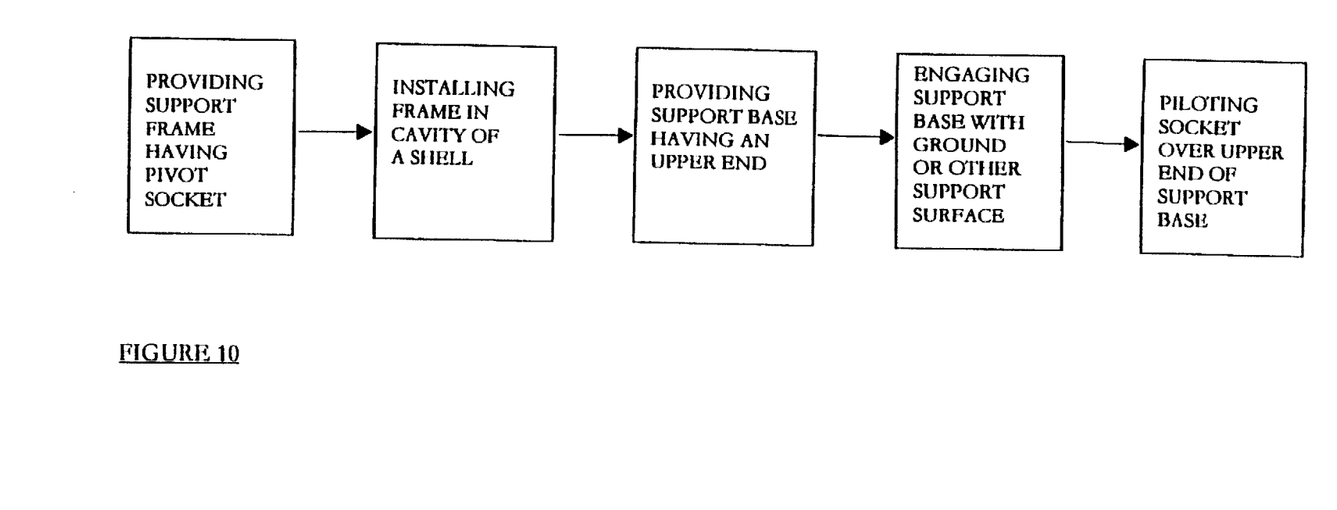
FIG. 10 is a block diagram illustrating a method of assembling a blind according to the invention.

The use of the first embodiment of the blind FIGS. 1–5 will now be described with reference to the block diagram of FIG. 10.

The user drives the lower end 62 of the stake 60 into the ground at the desired location to orient the stake 60 generally vertically and locate its upper end 64 at the desired level. The frame 30 is installed within the shell 12 by inserting the frame 30 into the cavity 22 and then piloting the mounting pins 44 into the side openings 26. The frame 30 may then be mounted on the stake 60 by simply piloting the socket 58 over the upper end 64 of the stake. The user then lies on the ground G next to the stake 60 with his body oriented in the desired direction. To conceal himself, the user U simply swings the shell 12 into position over the upper portion of his body, with the remaining lower portion being camouflaged or concealed beneath another decoy shell or camouflage screen, if desired.

While in the generally prone position, the user U may call the geese and, if desired, may tilt the shell 12 forwardly in the frame, as illustrated by the broken chain line position in FIG. 2 to provide himself with a partial overhead view without completely revealing his upper body. As a flock of geese approaches, the user may tilt the shell 12 back to the horizontal position to completely conceal himself once again. To make the blind appear more natural and lifelike, the user may pivot the shell 12 slightly about the pivot axis to make the shell 12 appear as if it were moving about as a live goose would do.

As the geese come within shooting range, the user simply swings the shell 12 out of his way and preferably to one side as in FIG. 5, to provide him with unobstructed overhead access, allowing the user to sit up, if desired, to take a shot at the geese. As hunting conditions change, the user U may reposition himself by simply orienting his body in the desired position about the stake and then cover himself by swinging the shell 12 into position over his body.

It will be appreciated that the blind 10 can be used in other conditions as well, such as a cover for a shallow pit or as a canopy or cover for other blinds and that the shell decoy 12 can be of other than a goose.

The disclosed embodiments are representative of presently preferred forms of the invention, but are intended to be illustrative rather than definitive thereof. The invention is defined in the claims.

I claim:

1. A blind device for use in concealing a user from view during the course of hunting or observing wildlife, said device comprising:

a generally dome-shaped shell structure having an outer shape and appearance serving to disguise the user from detection by such wildlife and an outer perimeter encompassing a coverage zone beneath said shell; and support structure operative to support said shell in a generally horizontal elevated position above the ground or other support surface to provide sufficient unobstructed space beneath said shell to accommodate and conceal at least a portion of the user's body, said support structure including a pivot connection defining a generally vertical pivot axis adjacent said outer perimeter of said shell, said shell being rotatable about said pivot axis with generally horizontal movement to enable the user to move said shell selectively between a covering position in which said shell overlies and conceals the user within said coverage zone of said shell and a revealing position in which said shell is rotated out of the way of the user to a position generally beside the user providing the user with substantially unobstructed overhead viewing and freedom of movement; and wherein said shell comprises a generally rigid molded plastic goose decoy configured to be stackable in nested relation with other such shells, and said support structure includes a support frame removably installable within said shell and a ground-engageable base coupled to said support frame by said pivot connection such that said shell and said frame are rotatable as a unit about said pivot axis of said pivot connection.

2. The device of claim 1 wherein said base is separable from said support frame and said support frame conforms closely to an inner surface of said shell so as to substantially retain the nested stackability of said shell with other such shells when said support frame is installed within said shell.

3. The device of claim 1 wherein said base comprises a rigid mounting stake engageable with the ground or other support surface at a lower end thereof and coupled to said frame at an upper end thereof by said pivot connection enabling said frame and said shell to rotate as a unit about said stake.

4. The device of claim 3 wherein said pivot connection includes a downwardly opening socket secured to said support frame along said pivot axis, said socket receiving said upper end of said stake to provide both pivotal support and cantilevered lateral support to said frame and said shell to support said shell in said generally horizontal elevated position and permitting said shell to rotate about said pivot axis with said generally horizontal movement.

5. The device of claim 1 wherein said support frame is removably installed within an interior downwardly opening cavity of said shell and substantially concealed from view from the exterior of said shell, said support frame including a longitudinal brace member extending longitudinally of said shell and a lateral brace member extending laterally of said shell, said lateral brace having shell-mounting portions engageable with opposite lateral sides of said shell for mounting said shell removable on said frame.

6. The device of claim 5 wherein said shell includes a pair of laterally opposed side openings and said shell-mounting portions comprise a pair of mounting pins carried on said lateral brace member and extendible into said side openings.

7. The device of claim 6 wherein said shell is tiltable on said support frame about a generally horizontal tilt axis of said mounting pins when installed in said side openings.

8. The device of claim 7 wherein said frame when installed within said shell to conforms closely to the contour of an inner surface of said shell, said longitudinal brace being coupled to said lateral brace and biased by said lateral brace into frictional engagement with said inner surface of said shell to support said shell in any selected one of a number of different positions of tilt adjustment on said frame.

9. The device of claim 8 wherein said inner surface of said shell includes longitudinally spaced ribs engagable selectively with said longitudinal brace during said tilting movement of said shell to positively lock said shell releasably in said selected positions of tilted adjustment.

10. The device of claim 5 wherein said pivot connection comprises a downwardly opening socket secured to said lateral brace adjacent one end thereof along said pivot axis, and said base of said support structure including a stake having an upper end receivable within said socket and dimensioned relative to said socket to provide both rotational support and cantilevered support to said frame on said stake.

11. The device of claim 5 wherein said mounting portions include a laterally spaced pair of upwardly opening mounting channels receiving laterally opposed lower free edge portions of said shell.

12. The device of claim 5 wherein said lateral brace is adjustable in length to adjust the lateral spacing between said mounting portions.

13. The device of claim 5 wherein said braces comprise flexible members coupled pivotally to one another intermediate their ends, said members being foldable to a generally collinear overlapping position when removed from said shell and positionable to an expanded transverse position in which said lateral brace extends cross-wise of said longitudinal brace for installation within said shell, said members being forced into an upwardly bowing domed configuration upon installing said members into said shell and retained in such configuration upon engaging said mounting portions of said lateral brace with said shell.

14. A blind device for use in concealing a user from view during the course of hunting or observing geese, said device comprising:

a generally dome-shaped shell structure having an outer generally convex surface with a shape and appearance simulating that of a goose and an inner generally concave surface defining an internal cavity of said shell that opens downwardly to a lower free edge of said shell, said shell having spaced apart lateral sides formed with a pair of side openings aligned along a common lateral tilt axis extending generally horizontally across said cavity of said shell;

a support frame removably installable within said cavity of said shell, said support frame including a longitudinal brace and a lateral brace, said longitudinal brace extending longitudinally along said inner surface of said shell when installed within said cavity, said lateral brace extending laterally along said inner surface of said shell when installed within said cavity and being generally upwardly bowed and conforming closely to the lateral contour of said inner surface, said braces having opposite ends and being joined to one another intermediate their ends, said lateral brace supporting a pair of mounting pins adjacent its opposite ends, said mounting pins being received in said side openings of said shell for mounting said support frame removably within said shell, said shell being selectively tiltable on said pins about said generally horizontal tilt axis, said longitudinal brace frictionally engaging said inner surface to provide resistance to said tilting movements for supporting said shell in any selected one of a number of tilted positions on said frame;

a pivot connection member fixed to said lateral brace adjacent one of its ends having a downwardly opening socket; and a rigid stake having a lower end engagable with the ground or other support surface, said stake having an upper end receivable in said socket and defining a generally vertical pivot axis, said socket and said upper end of said stake being dimensioned to provide cantilevered support to said frame and said shell to support said shell at an elevated generally horizontal position above the ground with sufficient space provided beneath said shell to accommodate a user in a prone position beneath said shell in order to conceal at least a portion of the user's body from view from above, said pivot connection member and said stake enabling said frame and said shell to be swung by the user with generally horizontal movement about said generally vertical pivot axis of said stake between a covering position in which said shell overlies and conceals the user and a revealing position in which said shell is swung out of the way of the user to a position generally beside the user so as to provide the user with substantially unobstructed overhead viewing and freedom of movement.

15. A support device for use in connection with a goose decoy having a generally dome-shaped shell body with an outer surface and appearance simulating that of a goose, an interior downwardly opening cavity, and a pair of laterally opposed side receivers provided in the shell on opposite lateral sides thereof, in order to support the shell at an elevated generally horizontal position above the ground to provide sufficient space beneath the shell to accommodate at least a portion of a user's body and to enable the shell to be swung by the user with generally horizontal movement about a generally vertical pivot axis adjacent a lateral side of the shell selectively between a covering position in which the shell overlies and conceals the user and a revealing position in which the shell is swung out of the way of the user to a position generally beside the user to provide the user with substantially unobstructed overhead viewing and freedom of movement, said support device comprising:

a support frame having a longitudinal brace member and a lateral brace member coupled to one another and positionable within the cavity of the shell so as to extend longitudinally and laterally of the shell, respectively, said lateral brace member having a pair of mounting pin portions provided adjacent opposite ends of said lateral brace, said mounting pin portions being positioned and dimensioned for disposition within the side receivers of the shell to mount the shell removably on said frame, said lateral brace member having a pivot connection portion adjacent one of its said ends, said pivot connection portion having a socket that opens generally vertically downwardly when the shell is mounted on said frame; and a rigid support base having a lower end thereof engagable with the ground or other support surface and an upper end receivable into said socket of said pivot connection portion, said socket and said upper end of said support base being dimensioned to provide cantilevered support to said frame such that when mounted on said support base said frame projects generally horizontally outwardly to a side of support base, said recess and said upper end of said support base further enabling said frame to be swung by the user with generally horizontal movement about a generally vertical pivot axis of said support base to support the shell for movement between the covering and revealing positions.

16. A support device for use in mounting a shell decoy in an elevated generally horizontal position above the ground or other support surface to serve as a blind beneath which a user may position himself to conceal at least a portion of his body from view from above, said support device comprising: a frame mountable within said shell and a separate stake drivable into the ground to provide a generally vertical rigid support, said frame having a pivot connection provided adjacent a laterally outer edge region of said frame, said pivot connection engageable with said stake to provide cantilevered support to said frame such that said frame projects generally horizontally outwardly of said stake to support the shell in like manner when mounted on said frame, said pivot connect ion enabling said frame to be swung by the user with generally horizontal movement about a generally vertical pivot axis of said stake selectively between a covering position in which said frame is in a position overlying the user to conceal the user beneath the shell and a revealing position in which said frame is swung to a position generally beside the user to move the shell out of the way of the user providing the user with substantially unobstructed overhead viewing and freedom of movement, said frame including a pair of cross braces extendable longitudinally and laterally of the shell when mounted therein, said laterally extendable brace having mounting portions adjacent opposite ends thereof that are engageable with the shell to mount and retain the shell removably on said frame, said pivot connection being secured to said laterally extendable brace adjacent one of its said ends to position said pivot connection adjacent a lateral side wall of the shell when the frame is installed in the shell.

17. The device of claim 16 wherein said frame includes a pair of laterally spaced mounting pins positionable within a pair of laterally opposed side receivers of the shell to mount and retain the frame removably within the shell.

18. The device of claim 17 wherein said cross braces are coupled pivotally to one another intermediate their ends and foldable to a generally coextending overlapping position when removed from the shell.

19. The device of claim 18 wherein said cross braces are made of a rigid resiliently flexible material positionable in an upwardly bowed dome-like configuration when installed in the shell to conform closely to an inner surface contour of the shell and returning to generally linear unstressed configurations when removed from the shell.

20. The device of claim 16 wherein said frame includes a pair of laterally spaced mounting channels opening upwardly and positioned to receive laterally opposite lower free edge portions of the shell when said frame is installed in the shell.

21. A method of assembling a hunter's blind comprising the steps of:

providing a support frame having longitudinal and lateral brace members coupled together, a pair of laterally brace members coupled together, a pair of laterally spaced mounting pins secured to the lateral brace member adjacent its opposite ends thereof, and a downwardly opening socket adjacent one end of the lateral brace member ends;

installing the support frame within a cavity of a shell by positioning the longitudinal brace member longitudinally of the shell and the lateral brace laterally of the shell and extending the mounting pins into side receivers of the shell to secure the shell releasably on the frame and locate the socket adjacent an associated lateral side of the shell;

providing a support base having a lower end thereof engageable with the ground or other support surface and an upper end receivable into the socket;

engaging the lower end of the support base with the ground or other support surface to provide a generally vertical pivot axis of the support base; and piloting the socket over the upper end of the support base to support the frame and shell in cantilevered fashion such that the frame and shell project outwardly to a side of the upper end and are positioned generally horizontally, and to enable the frame and shell to be swung with general horizontal motion about the generally vertical axis of the support base allowing the user to position the shell selectively between a covering position overlying and concealing the user and a revealing position in which the shell and frame swing out of the way of the user to a position generally beside the user providing the user with generally unobstructed overhead viewing and freedom of upward movement and revealing positions.

* * * * *